United States Patent
Riess et al.

(10) Patent No.: US 10,278,046 B2
(45) Date of Patent: Apr. 30, 2019

(54) SELECTIVE ANTENNA ALLOCATION

(71) Applicant: GM Global Technology Operations LLC, Detroit, MI (US)

(72) Inventors: Eilon Riess, Zikron-Yaakov (IL); Igal Kotzer, Tel-Aviv (IL); Omer Tsimhoni, Bloomfield Hills, MI (US); Mo Wazir, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 15/413,800

(22) Filed: Jan. 24, 2017

(65) Prior Publication Data

US 2018/0213541 A1 Jul. 26, 2018

(51) Int. Cl.
| | |
|---|---|
| H04W 4/00 | (2018.01) |
| H04W 4/80 | (2018.01) |
| H01Q 1/00 | (2006.01) |
| H04B 7/06 | (2006.01) |
| H04B 7/08 | (2006.01) |
| H01Q 21/30 | (2006.01) |
| H01Q 5/35 | (2015.01) |
| H04W 84/12 | (2009.01) |

(52) U.S. Cl.
CPC ............ *H04W 4/80* (2018.02); *H01Q 1/00* (2013.01); *H01Q 5/35* (2015.01); *H01Q 21/30* (2013.01); *H04B 7/0602* (2013.01); *H04B 7/0802* (2013.01); *H04W 84/12* (2013.01)

(58) Field of Classification Search
CPC ....... H04W 72/10; H04W 4/80; H04W 4/008; H04W 72/046; H04W 72/0453; H04W 84/12
See application file for complete search history.

(56) References Cited

U.S. PATENT DOCUMENTS

| | | | | |
|---|---|---|---|---|
| 7,873,385 B2 * | 1/2011 | Boireau | ............... | H04B 1/0057 455/553.1 |
| 2003/0093187 A1 * | 5/2003 | Walker | .................... | B64C 13/20 701/1 |
| 2008/0139118 A1 * | 6/2008 | Sanguinetti | .......... | H04B 1/0053 455/41.2 |
| 2008/0181155 A1 * | 7/2008 | Sherman | ........... | H04W 52/0229 370/311 |
| 2008/0319665 A1 * | 12/2008 | Berkobin | ............... | G07C 5/008 701/469 |
| 2009/0258607 A1 * | 10/2009 | Beninghaus | ......... | H04B 1/3805 455/77 |
| 2009/0262669 A1 * | 10/2009 | Sanders | ................. | H04B 1/006 370/278 |
| 2010/0120466 A1 * | 5/2010 | Li | .......................... | H04B 1/006 455/552.1 |

(Continued)

*Primary Examiner* — Clemence S Han
(74) *Attorney, Agent, or Firm* — Cantor Colburn LLP (57) ABSTRACT

Examples of techniques for selective antenna allocation are disclosed. In one example implementation according to aspects of the present disclosure, a computer-implemented method may include receiving a first request for an antenna from a first transceiver. The method may further include receiving a second request for the antenna from a second transceiver. Additionally, the method may include selectively allocating the antenna to one of the first transceiver or the second transceiver based on the higher of a priority of the first transceiver and a priority of the second transceiver.

19 Claims, 4 Drawing Sheets

(56) References Cited

U.S. PATENT DOCUMENTS

| | | | | |
|---|---|---|---|---|
| 2010/0227570 A1* | 9/2010 | Hendin | H04B 1/006 | 455/78 |
| 2011/0116479 A1* | 5/2011 | Jarzra | H04L 12/5692 | 370/332 |
| 2011/0175789 A1* | 7/2011 | Lee | H01Q 1/243 | 343/853 |
| 2011/0269456 A1* | 11/2011 | Krishnaswamy | H04W 8/26 | 455/426.1 |
| 2012/0044913 A1* | 2/2012 | Smadi | H04W 28/26 | 370/336 |
| 2013/0005350 A1* | 1/2013 | Campos | H04W 48/18 | 455/456.1 |
| 2013/0044603 A1* | 2/2013 | Macias | H04W 48/18 | 370/241 |
| 2013/0148636 A1* | 6/2013 | Lum | H04B 1/0064 | 370/336 |
| 2013/0191571 A1* | 7/2013 | du Preez | G06F 13/42 | 710/106 |
| 2013/0196673 A1* | 8/2013 | Smadi | H04W 56/001 | 455/450 |
| 2013/0273952 A1* | 10/2013 | Srikanteswara | H04W 76/10 | 455/509 |
| 2014/0349584 A1* | 11/2014 | Clevorn | H04B 7/0689 | 455/67.13 |
| 2015/0085650 A1* | 3/2015 | Cui | H04W 92/02 | 370/230 |
| 2015/0155891 A1* | 6/2015 | Soliman | H04B 1/0067 | 455/552.1 |
| 2015/0296450 A1* | 10/2015 | Koo | H04W 48/16 | 455/435.3 |
| 2016/0227535 A1* | 8/2016 | Sharma | H04W 72/0453 | |
| 2016/0261291 A1* | 9/2016 | Colella | H04B 1/0064 | |
| 2016/0365885 A1* | 12/2016 | Honjo | H04B 1/38 | |
| 2017/0099686 A1* | 4/2017 | Green | H04L 27/0014 | |
| 2017/0156174 A1* | 6/2017 | Chaponniere | H04W 48/18 | |
| 2017/0245311 A1* | 8/2017 | Murray | H04W 76/022 | |
| 2017/0280374 A1* | 9/2017 | Hayes | H04W 56/0015 | |
| 2017/0280504 A1* | 9/2017 | De Pasquale | H04W 76/10 | |

* cited by examiner

SELECTIVE ANTENNA ALLOCATION

INTRODUCTION

The present disclosure relates to a data communication using transceivers and an antenna in a vehicle.

A vehicle, such a car, motorcycle, a boat, or any other type of automobile may be equipped with transceivers to transmit and receive data. Typically, each transceiver uses its own antenna to transmit and receive the data to and from other devices. Accordingly, a vehicle may include multiple antennae for multiple transceivers. However, each additional antenna occupies space on or in the vehicle, utilizes additional wiring, uses more power, and accordingly increases overall costs of the vehicle. Accordingly, it is desirable to provide a multi-purpose antenna to transmit and receive data from multiple transceivers.

SUMMARY

In one exemplary embodiment, a computer-implemented method for selective antenna allocation may include receiving, by a processing device, a first request for an antenna from a first transceiver. The method may further include receiving, by the processing device, a second request for the antenna from a second transceiver. Additionally, the method may include selectively allocating, by the processing device, the antenna to one of the first transceiver or the second transceiver based on the higher of a priority of the first transceiver and a priority of the second transceiver.

An example computer-implemented method may further include, responsive to allocating the antenna to the first transceiver, communicating data using the first transceiver via the antenna and not communicating data using the second transceiver. An example computer-implemented method may further include, responsive to allocating the antenna to the second transceiver, communicating data using the second transceiver via the antenna and not communicating data using the first transceiver. In some example computer-implemented methods, each of the plurality of transceivers communicate using a frequency similar to the other of the plurality of transceivers. In some example computer-implemented methods, one transceiver of the plurality of transceivers is a WiFi transceiver. In some example computer-implemented methods, one transceiver of the plurality of transceivers is a dedicated short range communications transceiver. In the example computer-implemented method, wherein one transceiver of the plurality of transceivers is a cellular transceiver.

In another exemplary embodiment a system for selective antenna allocation may include an antenna configured to transmit and receive data over a range of frequencies. The system may further include a plurality of transceivers, wherein each of the plurality of transceivers is configured to transmit and receive data over a subset of the range of frequencies. Additionally, the system may include an antenna selection module configured to selectively allocate one of the plurality of transceivers to the antenna based on at least one of a priority of the transceiver and an operating mode of a vehicle.

In some example systems, the plurality of transceivers may include a first transceiver and a second transceiver, and wherein the antenna selection module allocates the antenna to the first transceiver when the first transceiver has a higher priority than the second transceiver. In some example systems, the plurality of transceivers may include a first transceiver and a second transceiver, and wherein the antenna selection module allocates the antenna to the first transceiver when vehicle is in a first operating mode. In some example systems, the antenna selection module may allocate the antenna to the second transceiver when the vehicle is in a second operating mode. In some example systems, wherein the antenna selection module allocates the antenna to a third transceiver when the vehicle is in an emergency mode. In some example systems, the operating mode of the vehicle is selected from the group including a driving mode, a parking mode, and an emergency mode.

In yet another exemplary embodiment a computer program product for selective antenna allocation may include a computer readable storage medium having program instructions embodied therewith, wherein the computer readable storage medium is not a transitory signal per se, the program instructions executable by a processing device to cause the processing device to perform a method. The method may include receiving, by the processing device, a first request for an antenna from a first transceiver. The method may further include receiving, by the processing device, a second request for the antenna from a second transceiver. Additionally, the method may include selectively allocating, by the processing device, the antenna to one of the first transceiver or the second transceiver based on the higher of a priority of the first transceiver and a priority of the second transceiver.

In some example computer program products, the method may include, responsive to allocating the antenna to the first transceiver, communicating data using the first transceiver via the antenna and not communicating data using the second transceiver. In some example computer program products, the method may include, responsive to allocating the antenna to the second transceiver, communicating data using the second transceiver via the antenna and not communicating data using the first transceiver. In some example computer program products, each of the plurality of transceivers may communicate using a frequency similar to the other of the plurality of transceivers. In some example computer program products, one transceiver of the plurality of transceivers is a WiFi transceiver. In some example computer program products, one transceiver of the plurality of transceivers is a dedicated short range communications transceiver. In some example computer program products, one transceiver of the plurality of transceivers is a cellular transceiver.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein include antenna selection techniques to enable multiple transceivers to share an antenna or antennae. For example, a vehicle may be equipped with multiple transceivers to transmit and receive data using a variety of wireless data communication protocols such as dedicated short-range communications (DSRC), Wi-Fi, cellular, etc. In existing implementations, a vehicle may include a dedicated antenna or multiple antennae for each of the multiple transceivers. Accordingly, if three transceivers are present in the vehicle, the vehicle uses at least three separate antennae to facilitate data communication to/from the three transceivers. This dedicated antenna model causes inefficiencies (e.g., additional physical space requirements for the multiple antennae) and additional costs to include the antennae. Moreover, if one of the antennae is damaged or becomes inoperable, its corresponding transceiver also becomes inoperable and unable to communicate its data.

Accordingly, in one embodiment, the technical solutions described herein facilitate using a single antenna to serve several transceivers using antenna selection techniques. In another embodiment, the technical solutions described herein facilitate using fewer antennae than transceivers to enable the transceivers using antenna selection techniques. Further, the technical solutions facilitate increased reliability, reduce costs, and increase user satisfaction. The present techniques may also provide for freedom in antenna design because antenna shape and dimensions can be designed without a direct correlation between an antenna and a particular transceiver (e.g., it is enough for the antenna to cover the desired frequency band regardless of individual antenna coverage).

In some examples, a vehicle includes a number of antennae. Each antenna is tagged by its frequency range support. Some antennae may include exactly the same frequency band support, while other antennae may include partially overlapping frequency band support. Additionally, some antennae individually support a certain frequency band. Once a transceiver desires to establish a link at a certain frequency, the presently disclosed antenna selection module lists all the antennae that support the certain frequency band (there is also the issue of bandwidth, but it is assumed that the frequency band support is wide enough such the whole needed communication bandwidth is supported) and selects from this pool the number of antennae the transceiver requires. In examples, the antenna selection module may include additional tasks other than just sorting antennae and choosing which. For example, the antenna selection module may include handling a case where some antennae are already in use so there are not enough available antennae for a specific transceiver, the detection of the transceiver's desired frequency band, etc.

One example of the technical solutions is now described, in which the following transceivers are present in a vehicle, with the corresponding approximate frequency bands they operate on and the number of antennae a typical transceiver needs: DSRC (5.9 GHz-6 GHz) needs 1-2 antennae; WiFi (2.4 GHz-2.49 GHz and 5.1 GHz-5.2 GHz) needs 1-2 antennae; cellular (0.7 GHz-1 GHz and 1.7 GHz-3.7 GHz) needs at least 2 antennae; car alarm (0.43 GHz) needs 1 antenna; Bluetooth (2.4 GHz-2.49 GHz) needs 1 antenna. Based on these example antennae, an antenna that supports various frequency bands can be implemented to support multiple transceivers. An example to such an antennae design can be: Antenna 1: 0.4 GHz-1 GHz; Antenna 2: 1.7 GHz-3.7 GHz; Antenna 3: 2.4 GHz-2.49 GHz; Antenna 4: 5.1 GHz-6 GHz.

Based on this example, a matrix of transceivers to antennae is as follows: DSRC—antenna 4; WiFi—antenna 2+antenna 3; Cellular—antenna 1+antenna 2; car alarm—antenna 1; Bluetooth—antenna 2 or antenna 3.

Note that some of these transceivers rarely work simultaneously. This significantly reduces any chances of multiplexing issues (e.g., car alarm+cellular). Some transceivers are quite likely to work together, so if there are not enough antennae to satisfy all transceivers' needs at a certain point in time, the antenna selection module can allocate the antennae to transceivers following some internal algorithm and cost function. In another example, the antenna selection module may message a certain transceiver via an internal communication protocol requesting to defer from transmission for a certain amount of time, at which point all the antennas are ready for it.

Figure 1:
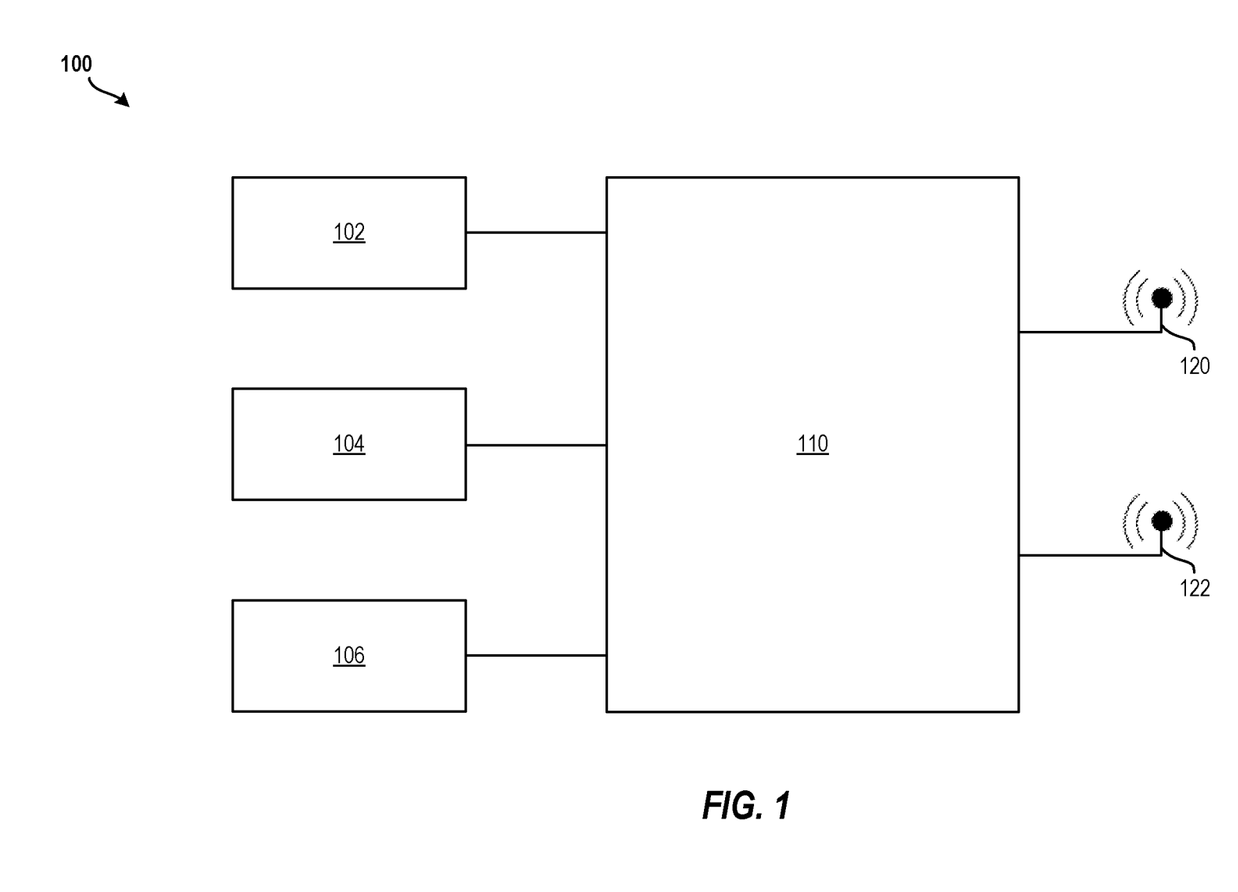
FIG. 1 illustrates a processing system for enabling an antenna to communicate over different communication protocols and/or frequencies based on an antenna selection process according to an exemplary embodiment.

FIG. 1 illustrates a processing system 100 for enabling an antenna to communicate over different communication protocols and/or frequencies based on an antenna selection process according to embodiments of the present disclosure. The system 100 may be arranged in a vehicle, such as a car, truck, van, bus, motorcycle, boat, plane, or another suitable vehicle. In the embodiment of FIG. 1, the system 100 includes a transceiver 102, a transceiver 104, a transceiver 106, an antenna selection module 110, an antenna 120, and an antenna 122. It should be appreciated that, in other embodiments, other numbers of transceivers and/or antennae may be implemented.

In the example of FIG. 1, the transceivers 102, 104, 106 operate using different communication protocols and/or frequencies than one another. For example, the transceiver 102 may be a cellular transceiver for sending and receiving cellular data operating in the range of about 700 MHz to about 4 GHz. The transceiver 104 may be a DSRC transceiver for sending and receiving DSRC data operating in the range of about 5.8 GHz to 6.0 GHz. The transceiver 106 may be a WiFi transceiver for sending and receiving WiFi data operating in the range of about 5.0 GHz to about 5.8 GHz. It should be appreciated that other types of communication protocols and/or frequencies may be implemented and any discussion of specific operating frequencies is merely to provide examples.

In one implementation, the WiFi transceiver (e.g., the transceiver 106) operates mostly when the vehicle is parked (such as when in home parking, in dealership parking, etc.), while the DSRC transceiver (e.g., the transceiver 104) operates mostly during driving. In additional, the cellular transceiver (e.g., the transceiver 102) may be used to make an emergency call. Generally, the use cases for the three transceivers 102, 104, 106 do not coexist in time. Therefore, the transceivers 102, 104, 106 can use a single external antenna (e.g., the antenna 120) because the transceivers 102, 104, 106 share similar frequencies, share external wireless needs, and normally do not require coexistence in time.

The antenna selection module 110 enables the antenna 120 and the antenna 122 to be used by each of the transceivers 102, 104, 106 by selectively allocating each of the antennae 120, 122 to one of the transceivers 102, 104, 106 at any given time. For example, the antenna 120 may be allocated to the transceiver 102, and the antenna 122 may be allocated to the transceiver 106. The selection can be based on vehicle information (e.g., parked mode, driving mode, emergency call, etc.) and service priorities (e.g., emergency over cellular, vehicle-to-vehicle using DSRC, over-the-air using WiFi, etc.). The vehicle provides signaling to the antenna selection module 110 to indicate a state of the vehicle (e.g., parked, driving, emergency call, etc.). In some examples, the antenna selection module 110 allocates an antenna to a transceiver based on the state/mode of the car.

In one mode (i.e., a default mode), the antenna 120 is allocated to the DSRC transceiver (e.g., the transceiver 104). In the default mode, the DSCR transceiver sends and receives DSRC data via the antenna 120. In embodiments that include a second antenna (e.g., the antenna 122), the cellular transceiver (e.g., the transceiver 102) and the WiFi transceiver (e.g., the transceiver 106) may share the antenna 122. In other words, the antenna selection module 110 selectively allocates the transceivers 102, 106 to the antenna 122 at any given time. For example, if a driver of the vehicle enables WiFi, the antenna selection module 110 allocates the transceiver 106 to the antenna 122. However, if the vehicle sends a signal indicating an emergency occurred and an emergency call needs to be placed, the antenna selection module 110 allocates the transceiver 102 to the antenna 122 so that the transceiver 102 (e.g., the cellular transceiver) can facilitate the emergency call.

The antenna selection module 110 may utilize priorities to selectively assign a transceiver to an antenna. For example, an emergency call may take a high priority versus using WiFi and therefore the antenna 122 is allocated to the cellular transceiver (e.g., the transceiver 102) over the WiFi transceiver (e.g., the transceiver 106) when an emergency call is to be placed.

The present techniques also provide for redundancy in the case of an antenna failure. For example, if the antenna 122 fails and only the antenna 120 is operational, the present techniques enable the transceivers 102, 104, 106 to each use the antenna 120 using the selection techniques described herein. By default, one of the transceivers, such as the DSRC transceiver (e.g., the transceiver 106) may be allocated to the antenna 120. However, the antenna selection module 110 may allocate other of the transceivers to the antenna 120 based on a priority and/or vehicle status. For example, if the vehicle is in park (i.e., not being driven), then the antenna selection module 100 allocates the WiFi transceiver (e.g., the transceiver 106) to the antenna 120. However, if the vehicle is in drive, then the antenna selection module 110 allocates the antenna 120 to the DSRC transceiver (e.g., the transceiver 104). If an emergency is detected by the vehicle and the vehicle indicates to the antenna selection module 110 that an emergency call needs to be placed, the antenna selection module allocates the cellular transceiver (e.g., the transceiver 102) to the antenna 120. The allocation of the cellular transceiver responsive to the emergency condition may occur, for example, because the emergency call has the highest priority when compared to DSRC and WiFi communications.

In an embodiment, the antenna 120 covers the cellular band and the antenna 122 covers the WiFi and DSCR bands. In this example, the cellular transceiver (e.g., the transceiver 102) is assigned to the antenna 120 and the antenna selection module 110 selectively allocates the antenna 122 to the WiFi and DSRC transceivers (e.g., the transceivers 106, 104) based on priority, driving mode, etc.

Figure 2:
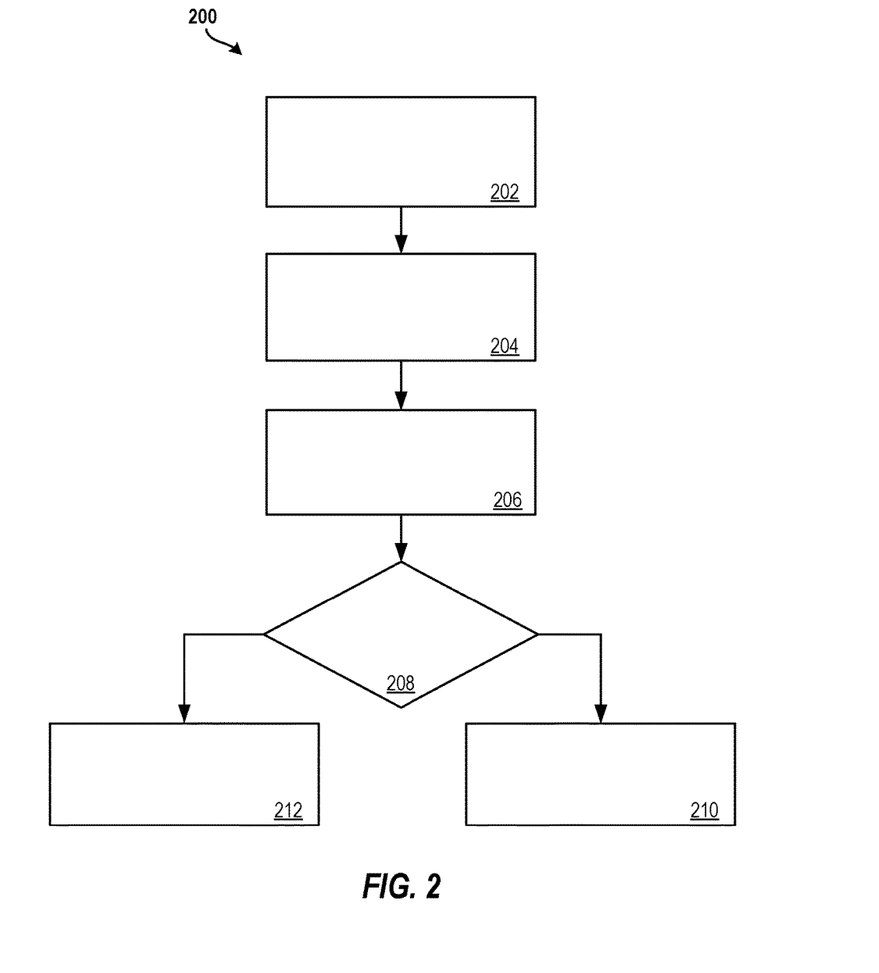
FIG. 2 illustrates a flow diagram of a method for enabling an antenna to communicate over different communication protocols and/or frequencies from multiple transceivers according to an exemplary embodiment.

FIG. 2 illustrates a flow diagram of a method 200 for enabling antennae 120, 122 to communicate over different communication protocols and/or frequencies from the transceivers 102, 104, 106 according to embodiments of the present disclosure. The method 200 may be implemented, for example, by the antenna selection module 110 of the processing system 100, by the processing system 20, or by another suitable processing system or device.

At block 202, the method 200 includes receiving a request to use an antenna at a particular frequency f. For example, the antenna selection module 110 receives a request from the transceiver 106 (e.g., the WiFi transceiver) to use the antenna 120.

At block 204, the method 200 includes assigning a priority p to the transceiver. For example, the antenna selection module 110 assigns a low priority to the transceiver 106 (e.g., the WiFi transceiver).

At block 206, the method 200 includes receiving a request to use the antenna at a particular frequency f from another transceiver. For example, the antenna selection module 110 receives a request from the transceiver 102 (e.g., the cellular transceiver), which is at a high priority.

At decision block 208, the method 200 determines how many antennae support the frequency f. If it is determined at decision block 208 that only one antenna (e.g., the antenna 120) supports the frequency f, then the request with the higher priority is connected to the antenna at block 210. In the example of the present embodiment, the antenna selection module 110 allocates the antenna 120 to the transceiver 102 because the transceiver 102 has a higher priority than the transceiver 106.

If, however, at decision block 208, it is determined that more than one antenna (e.g., the antennas 120, 122) supports the frequency f, then multiple transceivers can be allocated at block 212. For example, if two antennae are available, each of the two antennae may be allocated to two different transceivers. The transceivers with the highest priority are allocated over transceivers with lower priority.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
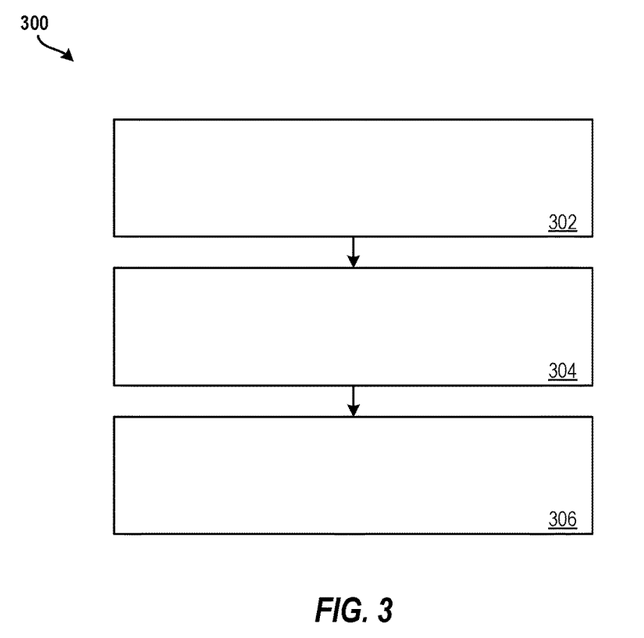
FIG. 3 illustrates a flow diagram of a method for selective antenna allocation according to an exemplary embodiment.

FIG. 3 illustrates a flow diagram of a method 300 for selective antenna allocation. The method 200 may be implemented, for example, by the antenna selection module 110 of the processing system 100, by the processing system 20, or by another suitable processing system or device.

At block 302, the method 300 includes receiving a first request for an antenna from a first transceiver. For example, the antenna selection module 110 receives a request from the transceiver 102 to transmit or receive data.

At block 304, the method 300 includes receiving a second request for the antenna from a second transceiver. For example, the antenna selection module 110 receives a request from the transceiver 106 to transmit or receive data.

At block 306, the method 300 includes selectively allocating the antenna to either the first transceiver or the second transceiver based on the higher of a priority of the first transceiver and a priority of the second transceiver. For example, the first transceiver (e.g., the transceiver 102) may be a cellular transceiver and the second transceiver (e.g., the transceiver 106) may be a WiFi transceiver.

In an example in which the cellular transceiver has a higher priority than the WiFi transceiver, the antenna is selectively allocated to the cellular transceiver. However, in an example in which the WiFi transceiver has a higher priority than the cellular transceiver, the antenna is selectively allocated to the WiFi transceiver. The priority may be preconfigured (such during manufacturing of the vehicle) or may be later adjusted. A cellular transceiver may have a higher priority, for example than a WiFi transceiver, if it is used to transmit an emergency call (either initiated by a driver/user or automatically by the vehicle).

In some examples, the method 300 may include communicating data using the first transceiver via the antenna and not communicating data using the second transceiver responsive to allocating the antenna to the first transceiver. Conversely, the method 300 may include communicating data using the second transceiver via the antenna and not communicating data using the first transceiver responsive to allocating the antenna to the second transceiver.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
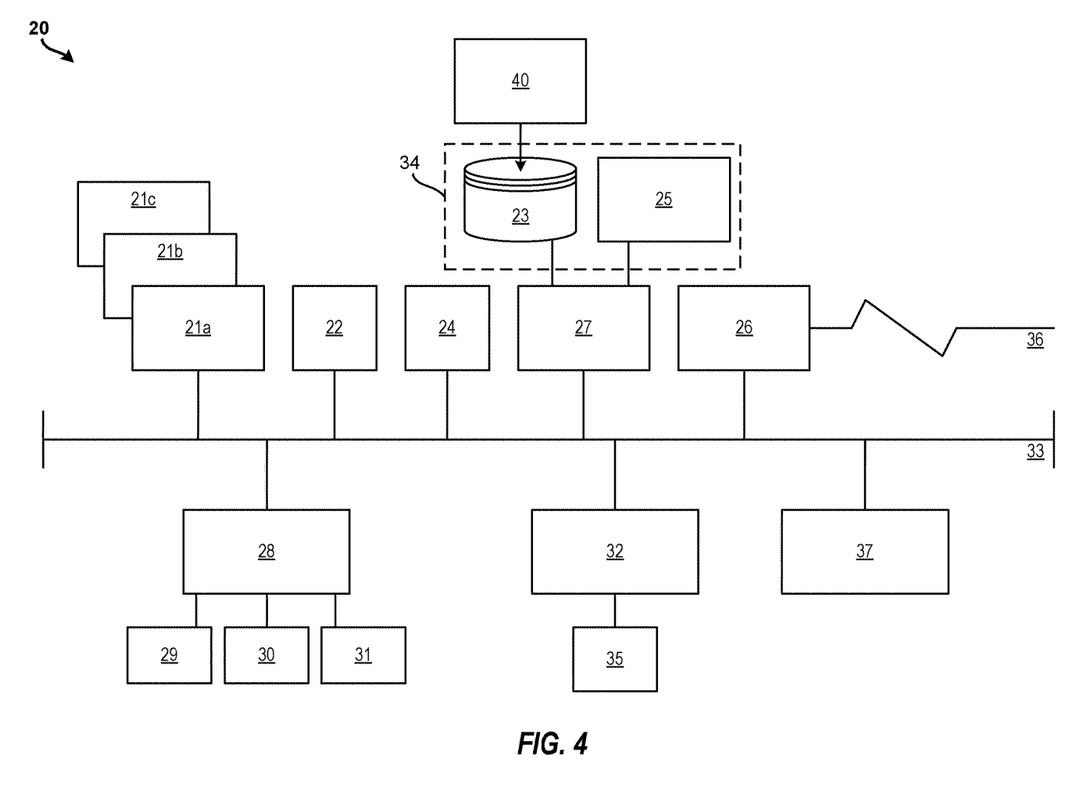
FIG. 4 illustrates a block diagram of a processing system for implementing the techniques described herein according to an exemplary embodiment.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. The communications adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for selective antenna allocation in a vehicle, the method comprising:
    receiving, by a processing device, a first request for an antenna from a first transceiver;
    receiving, by the processing device, a second request for the antenna from a second transceiver; and
    selectively allocating, by the processing device, the antenna to either the first transceiver or the second transceiver based on the higher of a priority of the first transceiver and a priority of the second transceiver and based on an operating mode of the vehicle, the operating mode of the vehicle being sent via a signal from the vehicle to the processing device.

2. The computer-implemented method of claim 1, further comprising:
    responsive to allocating the antenna to the first transceiver, communicating data using the first transceiver via the antenna and not communicating data using the second transceiver.

3. The computer-implemented method of claim 1, further comprising:
responsive to allocating the antenna to the second transceiver, communicating data using the second transceiver via the antenna and not communicating data using the first transceiver.

4. The computer-implemented method of claim 1, wherein each of the plurality of transceivers communicate using a frequency that is the same as the other of the plurality of transceivers.

5. The computer-implemented method of claim 1, wherein one transceiver of the plurality of transceivers is a WiFi transceiver.

6. The computer-implemented method of claim 1, wherein one transceiver of the plurality of transceivers is a dedicated short range communications transceiver.

7. The computer-implemented method of claim 1, wherein one transceiver of the plurality of transceivers is a cellular transceiver.

8. A system for selective antenna allocation in a vehicle, the system comprising:
an antenna configured to transmit and receive data over a range of frequencies;
a plurality of transceivers, wherein each of the plurality of transceivers is configured to transmit and receive data over a subset of the range of frequencies; and
an antenna selection module configured to selectively allocate the antenna to one of the plurality of transceivers based on at least one of a priority of the transceiver and an operating mode of the vehicle, the operating mode of the vehicle being sent to the antenna selection module via a signal from the vehicle, the operating mode of the vehicle being selected from the group consisting of a driving mode, a parked mode, and an emergency mode.

9. The system of claim 8, wherein the plurality of transceivers comprises a first transceiver and a second transceiver, and wherein the antenna selection module allocates the antenna to the first transceiver when the first transceiver has a higher priority than the second transceiver.

10. The system of claim 8, wherein the plurality of transceivers comprises a first transceiver and a second transceiver, and wherein the antenna selection module allocates the antenna to the first transceiver when the vehicle is in a first operating mode, the first operating mode being one of the driving mode, the parked mode, or the emergency mode.

11. The system of claim 10, wherein the antenna selection module allocates the antenna to the second transceiver when the vehicle is in a second operating mode, the second operating mode being another of the driving mode, the parked mode, or the emergency mode that differs from the first operating mode.

12. The system of claim 11, wherein the antenna selection module allocates the antenna to a third transceiver when the vehicle is in the emergency mode.

13. A computer program product for selective antenna allocation in a vehicle, the computer program product comprising:
a computer readable storage medium having program instructions embodied therewith, wherein the computer readable storage medium is not a transitory signal per se, the program instructions executable by a processing device to cause the processing device to perform a method comprising:
receiving, by the processing device, a first request for an antenna from a first transceiver;
receiving, by the processing device, a second request for the antenna from a second transceiver; and
selectively allocating, by the processing device, the antenna to one of the first transceiver or the second transceiver based on the higher of a priority of the first transceiver and a priority of the second transceiver and based on an operating mode of the vehicle, the operating mode of the vehicle being sent via a signal from the vehicle to the processing device.

14. The computer program product of claim 13, the method further comprising:
responsive to allocating the antenna to the first transceiver, communicating data using the first transceiver via the antenna and not communicating data using the second transceiver.

15. The computer program product of claim 13, the method further comprising:
responsive to allocating the antenna to the second transceiver, communicating data using the second transceiver via the antenna and not communicating data using the first transceiver.

16. The computer program product of claim 13, wherein each of the plurality of transceivers communicate using a frequency that is the same as the other of the plurality of transceivers.

17. The computer program product of claim 13, wherein one transceiver of the plurality of transceivers is a WiFi transceiver.

18. The computer program product of claim 13, wherein one transceiver of the plurality of transceivers is a dedicated short range communications transceiver.

19. The computer program product of claim 13, wherein one transceiver of the plurality of transceivers is a cellular transceiver.

* * * * *